Figure 1:
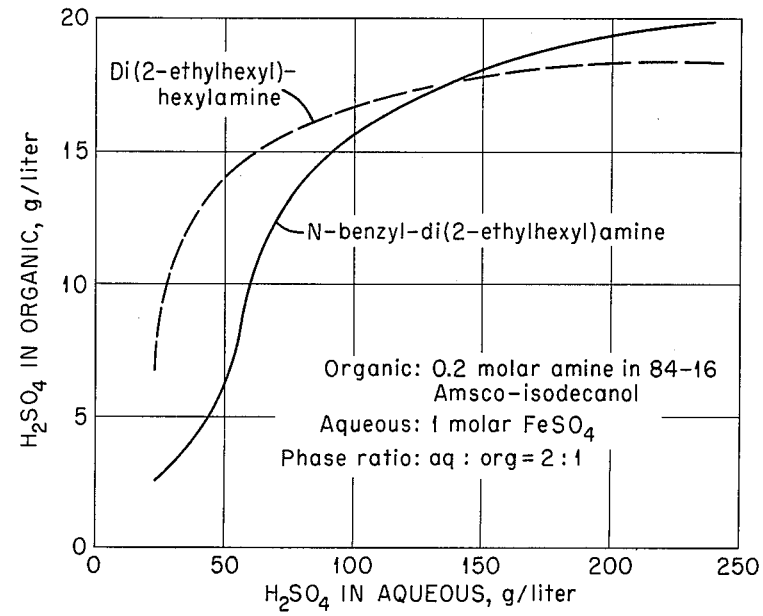

EXTRACTION OF SULFURIC ACID

STRIPPING OF SULFURIC ACID WITH WATER

INVENTOR.
David J. Crouse, Jr.
BY
ATTORNEY.

United States Patent Office 3,211,526
Patented Oct. 12, 1965

3,211,526
RECOVERY OF SULFURIC ACID FROM AN AQUEOUS SOLUTION CONTAINING METAL VALUES BY EXTRACTION WITH TERTIARY AMINES
David J. Crouse, Jr., Oak Ridge, Tenn., assignor to the United States of America as represented by the United States Atomic Energy Commission
Filed Aug. 6, 1963, Ser. No. 300,399
6 Claims. (Cl. 23—172)

My invention relates in general to methods for separating acids from aqueous solutions and more particularly to methods for recovering sulfuric acid from acidic aqueous solutions containing metal values together with sulfuric acid.

Industrial processes for treating metals with sulfuric acid, such as processes for pickling steel and processes for dissolving stainless steel cladding from reactor fuel elements produce waste solutions containing metal values in dilute solutions of sulfuric acid. Removal and recovery of sulfuric acid from these solutions is obviously desirable in order to simplify the problem of disposing of the waste and to be able to recycle the sulfuric acid.

It has been known that the amines will extract sulfuric acid from aqueous solutions; however, no useful process for recovering sulfuric acid from aqueous solutions has been developed based on this property of amines because of the difficulty of recovering the sulfuric acid from the amines. The acid can be stripped from the amine by contacting the sulfuric acid-amine complex with a base, but this produces a salt which usually is not of value. The sulfuric acid-amine complex can be hydrolyzed with water to produce sulfuric acid by a two-step reaction:

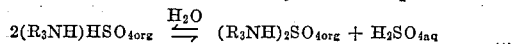

(1)

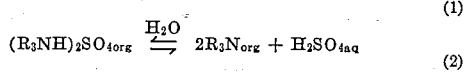

(2)

However, with most amines, including the tertiary amines which have been used extensively as metal extractants, Reaction 2 does not proceed significantly except upon contacting the amine with very large volumes of water. The resulting sulfuric acid solution is too dilute to be of interest.

It is accordingly one object of my invention to provide a method of recovering sulfuric acid from sulfuric acid solutions containing metal values.

Other objects of my invention will be apparent from the following detailed description and the claims appended hereto.

I have discovered that tertiary amines having a specific type of branching are easily hyldrolyzed to the free-base form with water [Reactions 1 and 2 above], and in accordance with my invention I have provided a method for recovering sulfuric acid from an aqueous solution containing said acid together with metal values comprising the steps of:

(1) Contacting said aqueous solution with an organic solution comprising a water-immiscible organic diluent and a tertiary amine having the formula

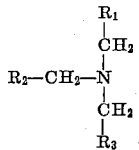

where $R_1$ and $R_2$ are selected from the group consisting of alkyl radicals having branching on the carbon atom nearest the nitrogen atom and aryl radicals and $R_3$ is an alkyl radical, whereby sulfuric acid is extracted into said organic solution;

(2) Separating the resulting sulfuric acid-containing organic solution from the resulting aqueous solution; and (3) Contacting the separated organic solution with water whereby sulfuric acid transfers into said water, forming an aqueous sulfuric acid solution.

My method permits recovery of sulfuric acid from aqueous solutions containing common metal ions, and the product contains sulfuric acid in a usefully high concentration, a concentration in the range of 50 to 120 grams per liter being achieved readily depending on amine type, phase ratios, and the concentration of sulfuric acid in the initial aqueous phase.

Figure 2:
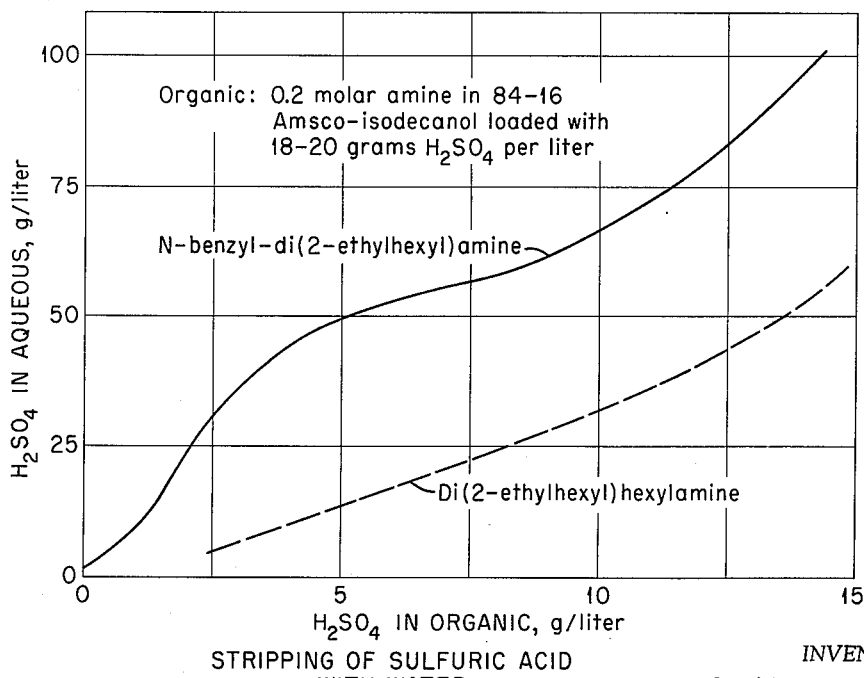

FIG. 1 is a graph showing the relationship between the concentration of sulfuric acid in the organic phase with the concentration of sulfuric acid in the aqueous phase in an extraction step for two amines useful in my process. FIG. 2 shows this relationship in a stripping step with these same amines.

In the first step of my process an aqueous solution from which sulfuric acid is to be recovered is contacted with an organic solution comprising a branched chain tertiary amine and a diluent.

The tertiary amine must contain at least two carbon chains having branching on the second carbon atom from the nitrogen atom. This branching requirement is met by the presence in the proper position of an aryl radical, such as a phenyl, as well as by branching in alkyl radical. The third carbon chain may be either branched or straight. The molecular weight of the amine should be high enough so that it has a low solubility in the aqueous phase, and a molecular weight of 300 to 500 is preferred. Examples of tertiary amines which are particularly well-suited for my process are: N-benzyl-di(2-ethylhexyl)amine, di(2-ethylhexyl)-n-hexylamine, tri(2-ethylhexyl)amine, dibenzyllauryamine, and di(2-ethylhexyl)laurylamine.

The most suitable amine for a specfic process will depend upon factors such as the concentration of sulfuric acid in the aqueous solution in the extraction step and the concentration of sulfuric acid after stripping. The sulfuric acid loading which can be obtained by di(2-ethylhexyl)hexylamine and N-benzyl-di(2-ethylhexyl)amine in the extraction step, and the concentration of sulfuric acid in the aqueous solution in the stripping step for the same amine for specified conditions are given in FIGS. 1 and 2. N-benzyl-di(2-ethylhexyl)amine is the preferred amine for recovery of sulfuric acid from aqueous solutions containing sulfuric acid in a concentration greater than 1.2 molar, while di(2-ethylhexyl)hexylamine is preferred for sulfuric acid concentrations in the range of about 0.3 molar to 1.2 molar. The most suitable amine for a particular process represents a balance between extraction and stripping powers, and it may be desirable to employ a mixture of amines to obtain the desired balance.

The concentration of the tertiary amine in the diluent is not critical and may be varied from about 0.1 molar to 0.5 molar, a higher loading of sulfuric acid in the organic phase being achieved with an increase in amine concentration.

Water-immiscible organic solvents known to be useful as diluents for amines in liquid-liquid extraction processes are useful in my process. Typical of these solvents are the petroleum hydrocarbons, such as kerosene; the aromatics, such as xylene or high flash point aromatic petroleum products; and the chlorinated hydrocarbons, such as carbon tetrachloride. With certain amines, a long-chain alcohol is added to the solvent phase to prevent separation of the amine salt from the solvent in the extraction step and to speed phase separation.

Using my invention, sulfuric acid can be recovered from an aqueous solution containing said acid in any concentration above 0.3 molar.

Although it is not essential to my process, it is preferred that the aqueous solution be substantially free of hydrochloric and nitric acids since these acids are extracted preferentially over sulfuric acid, and increase the difficulty of recovering sulfuric acid.

The tertiary amines do not extract common metal values such as iron, chromium, nickel, aluminum, magnesium, and copper; consequently, my process is useful in separating sulfuric acid from these metal values.

Having thus described my invention, the following examples are offered to illustrate it in more detail. Examples I through VIII illustrate my method of recovering sulfuric acid from aqueous solution and Examples IX through XIV show the relatively poor recovery of sulfuric acid using other, structurally similar, tertiary amines.

EXAMPLE I

Twenty milliliters of an aqueous solution 0.5 molar in $H_2SO_4$ and 1 molar in $FeSO_4$ was contacted with 10 milliliters of a 0.2 molar solution of N-benzyl-di(ethylhexyl)amine in a diluent consisting of Amsco 125–82 (a kerosene-type hydrocarbon) and isodecanol in the ratio of 84 parts Amsco to 16 parts isodecanol. The two phases were separated, and an analysis was made of each phase. The organic phase contained 5.5 grams per liter of sulfuric acid and the aqueous phase contained 48 grams per liter of sulfuric acid. The organic phase was then contacted with 5 milliliters of water for two minutes. These two phases were then separated and an analysis was made of each phase. The aqueous phase contained 10 grams per liter of sulfuric acid and the organic phase contained 0.2 gram per liter of sulfuric acid. The data of this example and that of Examples II–VIII are given in Table I below.

As can be seen from the above example, water is highly effective in stripping sulfuric acid from N-benzyl-di(2-ethylhexyl)amine.

EXAMPLE II

The procedure of Example I was followed in recovering sulfuric acid from an aqueous solution 2.5 molar in $H_2SO_4$ and 1 molar in $FeSO_4$ using a 0.2 molar solution of N-benzyl-di(2-ethylhexyl)amine in a diluent consisting of 84 percent Amsco 125–82 and 16 percent isodecanol. The resulting data are given in Table I.

EXAMPLE III

The procedure of Example I was followed in recovering sulfuric acid from an aqueous solution 0.5 molar in sulfuric acid and 1.0 molar in $FeSO_4$ using 0.2 molar di(2-ethylhexyl)-n-hexylamine in a diluent consisting of 84 percent Amsco 125–82 and 16 percent isodecanol. The resulting data are given in Table I below.

EXAMPLE IV

The procedure of Example I was followed in recovering sulfuric acid from an aqueous solution 2.5 molar in sulfuric acid and 1.0 molar in $FeSO_4$ using 0.2 molar di(2-ethylhexyl)-n-hexylamine in a diluent consisting of 84 percent Amsco 125–82 and 16 percent isodecanol. The resulting data are given in Table I below.

EXAMPLE V

The procedure of Example I was followed in recovering sulfuric acid from an aqueous solution 0.5 molar in sulfuric acid and 1.0 molar in $FeSO_4$ using 0.2 molar tri(2-ethylhexyl)amine in a diluent consisting of 84 percent Amsco 125–82 and 16 percent isodecanol. The resulting data are given in Table I.

EXAMPLE VI

The procedure of Example I was followed in recovering sulfuric acid from an aqueous solution 2.5 molar in sulfuric acid and 1.0 molar in $FeSO_4$ using 0.2 molar tri(2-ethylhexyl)amine in a diluent consisting of 84 percent Amsco 125–82 and 16 percent isodecanol. The resulting data are given in Table I.

EXAMPLE VII

The procedure of Example I was followed in recovering sulfuric acid from an aqueous solution 0.5 molar in sulfuric acid and 1.0 molar in $FeSO_4$ using 0.25 molar di(2-ethylhexyl)laurylamine in a diluent consisting of 87 percent Amsco 125–82 and 13 percent isodecanol. The resulting data are given in Table I.

EXAMPLE VIII

The procedure of Example I was followed in recovering sulfuric acid from an aqueous solution 2.5 molar in sulfuric acid and 1.0 molar in $FeSO_4$ using 0.25 molar di(2-ethylhexyl)laurylamine in a diluent consisting of 87 percent Amsco 125–82 and 13 percent isodecanol. The resulting data are given in Table I.

Table I

| Example No. | Amine | $H_2SO_4$, grams/liter | | | | $H_2SO_4$ Stripping Coeff. |
|---|---|---|---|---|---|---|
| | | Extraction | | Stripping | | |
| | | Org. | Aq. | Org. | Aq. | |
| I | N-benzyl-di(2-ethylhexyl) | 5.5 | 48 | 0.2 | 10.0 | 50 |
| II | ____do____ | 20.2 | 238 | 2.4 | 36 | 15 |
| III | Di(2-ethylhexyl)-n-hexyl | 13.8 | 44 | 6.0 | 16 | 2.7 |
| IV | ____do____ | 18.6 | 243 | 8.1 | 22 | 2.7 |
| V | Tri(2-ethylhexyl) | 1.7 | 48 | 0.35 | 3.0 | 8.6 |
| VI | ____do____ | 18.7 | 232 | 1.6 | 38 | 24 |
| VII | Di(2-ethylhexyl) | 14.1 | 46 | 4.9 | 25 | 5.1 |
| VIII | ____do____ | 20.6 | 236 | 8.2 | 19 | 2.3 |

As can be seen from Table I sulfuric acid can be stripped from these tertiary amines with water leaving a relatively low concentration of sulfuric acid in the organic phase.

The following examples illustrate the relatively poor results achieved even using amines which are structurally similar to the amines used in my process.

EXAMPLE IX

The procedure of Example I was followed in recovering sulfuric acid from an aqueous solution 0.5 molar in $H_2SO_4$ and 1.0 molar in $FeSO_4$ using tri(iso-octyl)amine (having branching no closer than the third carbon atom) in a diluent consisting of 92 percent Amsco 125–82 and 8 percent isodecanol. The resulting data are given in Table II.

EXAMPLE X

The procedure of Example I was followed in recovering sulfuric acid from an aqueous solution 2.5 molar in sulfuric acid and 1.0 molar in $FeSO_4$ using the tri(iso-octyl)amine solution of Example IX. The resulting data are given in Table II.

EXAMPLE XI

The procedure of Example I was followed in recovering sulfuric acid from an aqueous solution 0.5 molar in sulfuric acid and 1.0 molar in $FeSO_4$ using Alamine 336 (a tertiary amine consisting of mixed n-octyl and n-decyl alkyls) in a diluent consisting of 84 percent Amsco 125–82 and 16 percent isodecanol. The resulting data are given in Table II.

EXAMPLE XII

The procedure of Example I was followed in recovering sulfuric acid from an aqueous solution 2.5 molar in sulfuric acid and 1.0 molar in $FeSO_4$ using the Alamine 336 solution of Example XI. The resulting data are given in Table II.

EXAMPLE XIII

The procedure of Example I was followed in recovering sulfuric acid from an aqueous solution 0.5 molar in sulfuric acid and 1.0 molar in FeSO$_4$ using didodecenyl-n-butylamine (the branching in the dodecenyl group being farther away from the nitrogen atom than the second carbon atom) in a diluent consisting of 95 percent Amsco 125–82 and 5 percent isodecanol. The resulting data are given in Table II.

EXAMPLE XIV

The procedure of Example I was followed in recovering sulfuric acid from an aqueous solution 2.5 molar in H$_2$SO$_4$ and 1.0 molar in FeSO$_4$ using the didodecenyl-n-butylamine solution of Example XIII. The resulting data are given in Table II.

Table II

| Example No. | Amine | H$_2$SO$_4$, grams/liter | | | | H$_2$SO$_4$ Stripping Coeff. |
|---|---|---|---|---|---|---|
| | | Extraction | | Stripping | | |
| | | Org. | Aq. | Org. | Aq. | |
| IX | Tri(iso-octyl) | 13.6 | 44 | 10.3 | 7.6 | 0.7 |
| X | ----do---- | 18.2 | 243 | 11.0 | 16.3 | 1.5 |
| XI | Alamine 336 | 11.2 | 42 | 8.4 | 6.7 | 0.8 |
| XII | ----do---- | 16.0 | 240 | 9.1 | 16.2 | 1.8 |
| XIII | Didodecenyl-n-butyl | 16.5 | 42 | 12.9 | 8.1 | 0.6 |
| XIV | ----do---- | 19.3 | 242 | 11.9 | 15.5 | 1.3 |

It is obvious from the relatively high concentration of sulfuric acid remaining in the organic phase after the stripping step that it would not be practicable to use these tertiary amines to recover sulfuric acid from a typical sulfuric acid-containing waste solution.

The above examples are intended to illustrate my invention, not to limit it. It is obvious that changes in the aqueous and organic phases may be made without departing from the spirit of my invention; for instance, my invention is well-suited for use with conventional continuous counter-current extracting and stripping techniques.

Having thus described my invention, I claim:

1. A method for recovering sulfuric acid from an aqueous solution containing said acid together with metal values comprising the steps of:
   (1) contacting said aqueous solution with an organic solution comprising a water-immiscible organic diluent and a tertiary amine having the formula

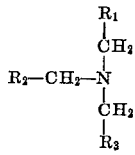

where R$_1$ and R$_2$ are selected from the group consisting of alkyl radicals having branching on the carbon atom nearest the nitrogen atom and aryl radicals and R$_3$ is an alkyl radical;
   (2) separating the resulting sulfuric acid-containing organic solution from the resulting aqueous solution; and
   (3) contacting the separated organic solution with water whereby sulfuric acid transfers into said water, forming an aqueous sulfuric acid solution.

2. The method of claim 1 wherein the tertiary amine is selected from the group consisting of N-benzyl-di(2-ethylhexyl)amine, di(2-ethylhexyl)-n-hexylamine, tri(2-ethylhexyl)amine, dibenzyllaurylamine and di(2-ethylhexyl)-laurylamine.

3. The method of claim 1 wherein the tertiary amine is N-benzyl-di(2-ethylhexyl)amine.

4. The method of claim 1 wherein the tertiary amine is N-benzyl-di(2-ethylhexyl)amine and the aqueous solution from which sulfuric acid is to be recovered contains sulfuric acid in a concentration greater than about 1.2 molar.

5. The method of claim 1 wherein the tertiary amine is di(2-ethylhexyl)-n-hexylamine.

6. The method of claim 1 wherein the tertiary amine is di(2-ethylhexyl)-n-hexylamine and the aqueous solution from which sulfuric acid is to be recovered contains sulfuric acid in a concentration from 0.3 to 1.2 molar.

References Cited by the Examiner

UNITED STATES PATENTS 1,669,102   5/28   Ruys ------------------ 23—173
1,783,901   12/30  Bottoms --------------- 23—3.3

OTHER REFERENCES

Boirie: "The Extraction of Some Sulfates and Bisulfates with Amines," Bulletin Societe Chimique de France 5, pages 980–5 (1958).

Coleman: "Amines as Extractants—Survey of the Descriptive and Fundamental Extraction Chemistry." Paper presented at the Solvent Extraction Chemistry Symposium, Gatlinburg, Tenn. October, 1962

Coleman et al.: "Solvent Extraction with Alkyl Amines," Industrial and Engineering Chemistry, vol. 50, pages 1756–62 (1958).

Smith et al.: "The Acid-Binding Properties of Long-Chain Aliphatic Amines," Journal of the Society of Chemical Industry, vol. 67, pages 48–51. (1948).

MAURICE A. BRINDISI, *Primary Examiner.*